United States Patent
Broadnax

[11] Patent Number: 5,996,820
[45] Date of Patent: Dec. 7, 1999

[54] HANGING RACK FOR BEEF JERKY

[76] Inventor: Sean Broadnax, 319 Del Norte Ave., Yuba City, Calif. 95991

[21] Appl. No.: 09/065,150

[22] Filed: Apr. 23, 1998

[51] Int. Cl.$^6$ .............. A47F 7/00; B42F 13/12; A47J 37/04; A47J 27/00

[52] U.S. Cl. ............ 211/85.4; 211/125; 99/421 H; 99/444

[58] Field of Search .................. 211/85.4, 125, 211/60.1, 70.1, 59.1, 113, 94.01; 99/444, 421 H, 421 HH, 421 A, 425, 426, 483, 449, 646 R

[56] References Cited

U.S. PATENT DOCUMENTS

| | | | |
|---|---|---|---|
| 181,387 | 8/1876 | Yost | 211/125 |
| 682,825 | 11/1901 | Schindler | 211/125 |
| 1,717,233 | 4/1929 | Lefiell | 211/85.4 |
| 2,205,064 | 10/1940 | Irwin | 211/85.4 |
| 3,297,166 | 1/1967 | Summers | 211/70.1 |
| 3,329,082 | 7/1967 | Satkunas | 211/125 |
| 3,858,495 | 1/1975 | Gotwalt | 99/421 H |
| 3,915,309 | 10/1975 | Brazdo | 211/85.4 |
| 4,078,478 | 3/1978 | Geisel | 99/421 H |
| 4,343,978 | 8/1982 | Kubiatowicz | 99/444 |
| 4,407,189 | 10/1983 | Bentson | 99/421 HH |
| 4,485,929 | 12/1984 | Betts, Sr. | 211/59.1 |
| 4,674,967 | 6/1987 | Oseka | 211/85.4 |
| 4,919,277 | 4/1990 | Jeruzal | 211/162 |
| 4,924,049 | 5/1990 | Dexter, Jr. | 99/444 |
| 4,924,764 | 5/1990 | Harrington | 99/444 |
| 4,974,502 | 12/1990 | Murdock | 211/858.4 |
| 5,071,014 | 12/1991 | Robinson | 211/206 |
| 5,163,567 | 11/1992 | Betts, Sr. | 211/59.1 |
| 5,172,628 | 12/1992 | Pillsbury et al. | 99/421 H |
| 5,193,443 | 3/1993 | Carney | 211/125 |
| 5,279,277 | 1/1994 | Barker | 99/444 |
| 5,367,950 | 11/1994 | Sarich | 99/421 H |
| 5,393,112 | 2/1995 | O'Connell | 211/85.4 |
| 5,425,461 | 6/1995 | Larson | 211/59.1 |
| 5,511,467 | 4/1996 | Motley et al. | 211/85.4 |
| 5,664,380 | 9/1997 | Hsueh | 211/184 |
| 5,715,744 | 2/1998 | Coutant | 99/421 H |
| 5,720,217 | 2/1998 | Pappas | 99/421 H |
| 5,782,168 | 7/1998 | Krhnak | 99/421 H |
| 5,782,224 | 7/1998 | Rabell | 99/421 H |
| 5,829,602 | 11/1998 | St John Danko | 211/85.4 |
| 5,887,513 | 3/1999 | Feilding et al. | 99/421 H |

*Primary Examiner*—David M. Purol
*Assistant Examiner*—Jennifer E. Novosad

[57] ABSTRACT

A new jerky hanging rack for facilitating the curing of meat strips which have been seasoned with a preferred recipe of ingredients by supporting the meat strips a finite distance apart allowing aeration of the meat strips until cured. The inventive device includes a rack structure formed into an elongated U-shaped structure with a first upper member and a second upper member secured to the cornice of the rack structure in opposition to one another, where the upper members include a plurality of skewer slots which receive a plurality of skewer members.

17 Claims, 7 Drawing Sheets

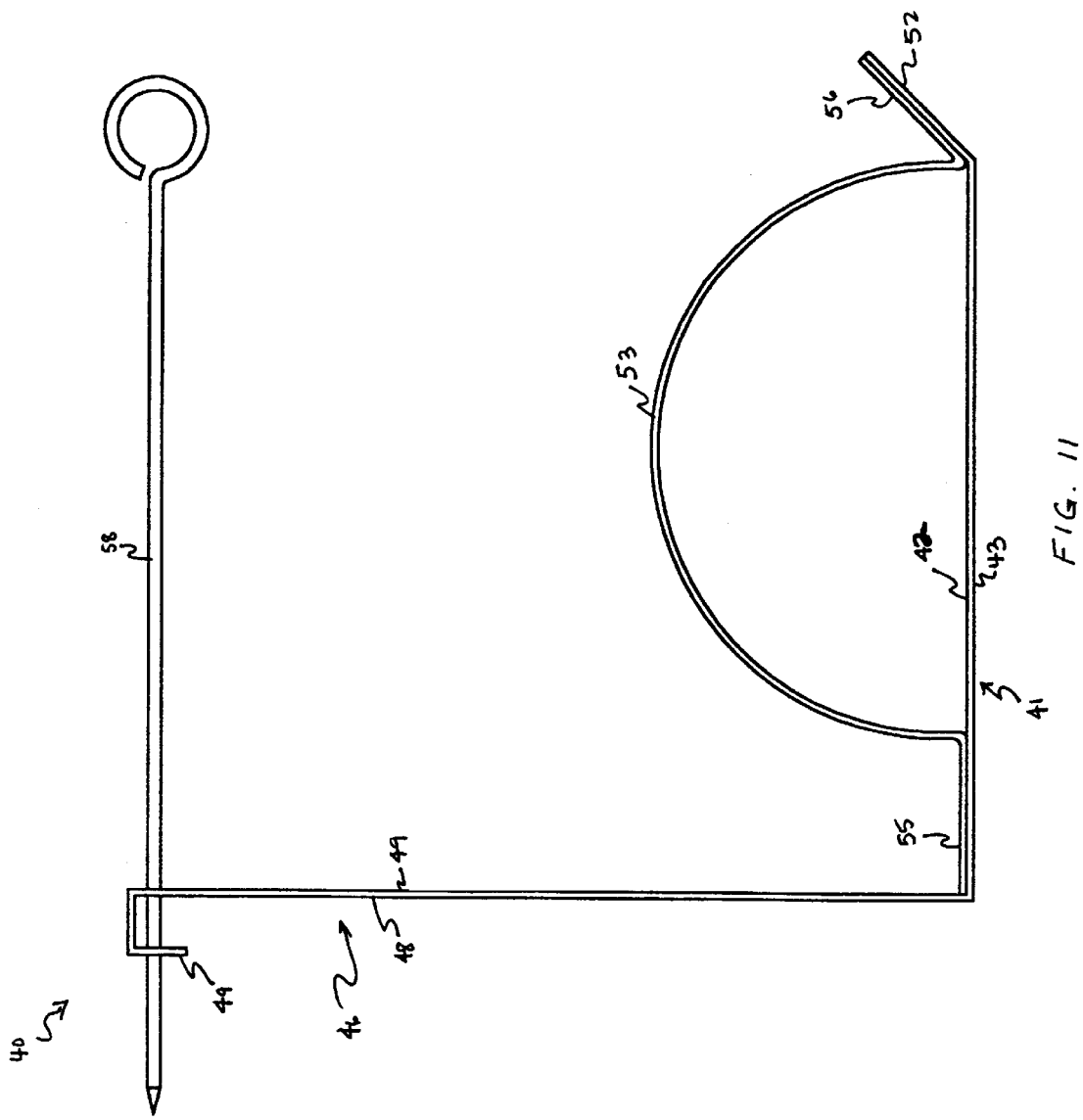

HANGING RACK FOR BEEF JERKY

BACKGROUND OF THE INVENTION

1. Field of the Invention

The present invention relates to cooking devices and more particularly pertains to a new jerky hanging rack for facilitating the curing of meat strips which have been seasoned with a preferred recipe of ingredients by supporting the meat strips a finite distance apart allowing aeration of said meat strips until cured.

2. Description of the Prior Art

The use of cooking devices is known in the prior art. More specifically, cooking devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art cooking devices include U.S. Pat. No. 4,952,764; U.S. Pat. No. 4,112,833; U.S. Design Pat. No. 260,227; U.S. Pat. No. 4,434,344; U.S. Pat. No. 4,933,528 and U.S. Pat. No. 4,942,288.

While these devices fulfill their respective, particular objectives and requirements, the aforementioned patents do not disclose a new jerky hanging rack. The inventive device includes a rack structure formed into an elongated U-shaped structure with a first upper member and a second upper member secured to the cornice of the rack structure in opposition to one another, where said upper members include a plurality of skewer slots which receive a plurality of skewer members.

In these respects, the jerky hanging rack according to the present invention substantially departs from the conventional concepts and designs of the prior art, and in so doing provides an apparatus primarily developed for the purpose of facilitating the curing of meat strips which have been seasoned with a preferred recipe of ingredients by supporting the meat strips a finite distance apart allowing aeration of said meat strips until cured.

SUMMARY OF THE INVENTION

In view of the foregoing disadvantages inherent in the known types of cooking devices now present in the prior art, the present invention provides a new jerky hanging rack construction wherein the same can be utilized for facilitating the curing of meat strips which have been seasoned with a preferred recipe of ingredients by supporting the meat strips a finite distance apart allowing aeration of said meat strips until cured.

The general purpose of the present invention, which will be described subsequently in greater detail, is to provide a new jerky hanging rack apparatus and method which has many of the advantages of the cooking devices mentioned heretofore and many novel features that result in a new jerky hanging rack which is not anticipated, rendered obvious, suggested, or even implied by any of the prior art cooking devices, either alone or in any combination thereof.

To attain this, the present invention generally comprises a rack structure formed into an elongated U-shaped structure with a first upper member and a second upper member secured to the cornice of the rack structure in opposition to one another, where said upper members include a plurality of skewer slots which receive a plurality of skewer members.

There has thus been outlined, rather broadly, the more important features of the invention in order that the detailed description thereof hat follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new jerky hanging rack apparatus and method which has many of the advantages of the cooking devices mentioned heretofore and many novel features that result in a new jerky hanging rack which is not anticipated, rendered obvious, suggested, or even implied by any of the prior art cooking devices, either alone or in any combination thereof.

It is another object of the present invention to provide a new jerky hanging rack which may be easily and efficiently manufactured and marketed.

It is a further object of the present invention to provide a new jerky hanging rack which is of a durable and reliable construction.

An even further object of the present invention is to provide a new jerky hanging rack which is susceptible to a low cost of manufacture with regard to both materials and labor, and which accordingly is then susceptible to low prices of sale to the consuming public, thereby making such jerky hanging rack economically available to the buying public.

Still yet another object of the present invention is to provide a new jerky hanging rack which provides in the apparatuses and methods of the prior art some of the advantages thereof, while simultaneously overcoming some of the disadvantages normally associated therewith.

Still another object of the present invention is to provide a new jerky hanging rack for facilitating the curing of meat strips which have been seasoned with a preferred recipe of ingredients by supporting the meat strips a finite distance apart allowing aeration of said meat strips until cured.

Yet another object of the present invention is to provide a new jerky hanging rack which includes a rack structure formed into an elongated U-shaped structure with a first upper member and a second upper member secured to the cornice of the rack structure in aposition to one another, where said upper members include a plurality of skewer slots which receive a plurality of skewer members.

Still yet another object of the present invention is to provide a new jerky hanging rack that cures meat strips quickly and efficiently without the utilization of an additional heat source.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 11 is a schematic end side view of a second embodiment of the present invention.

DESCRIPTION OF THE PREFERRED EMBODIMENT

Figure 1:
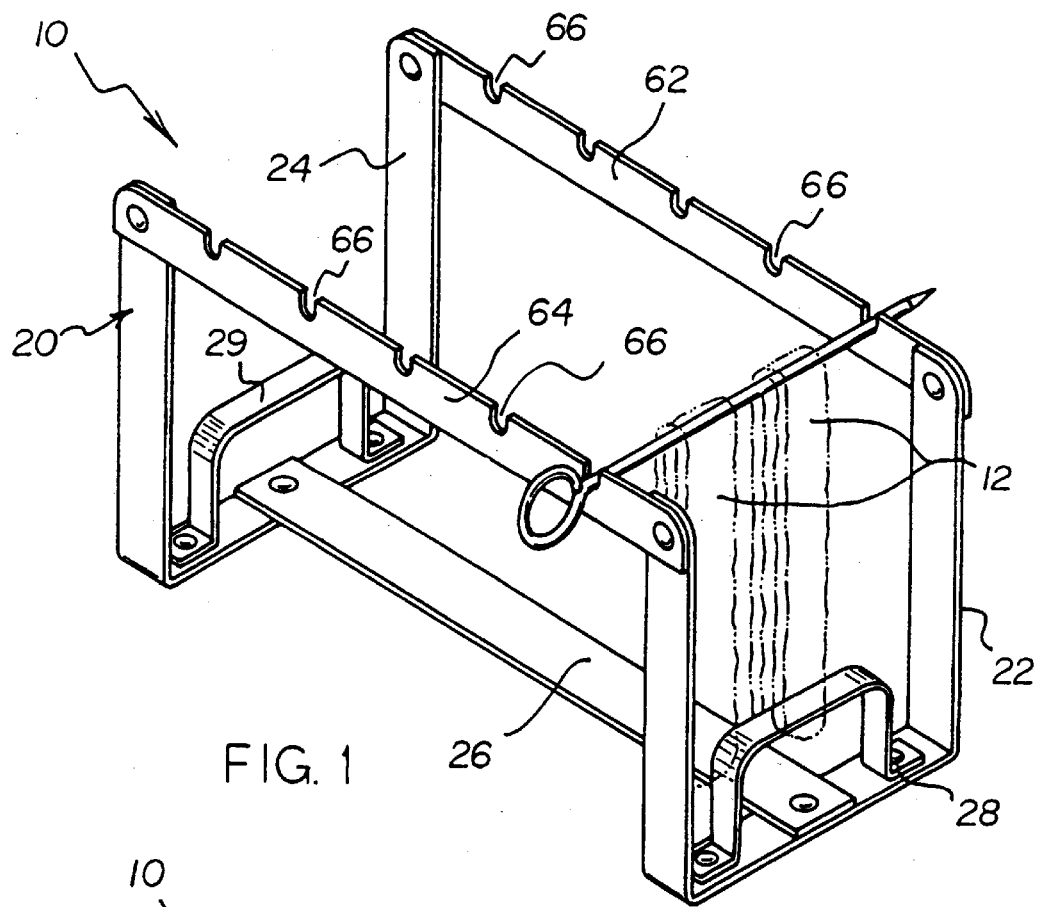
FIG. 1 is a left side perspective view of a new jerky hanging rack supporting meat strips according to the present invention.
Figure 2:
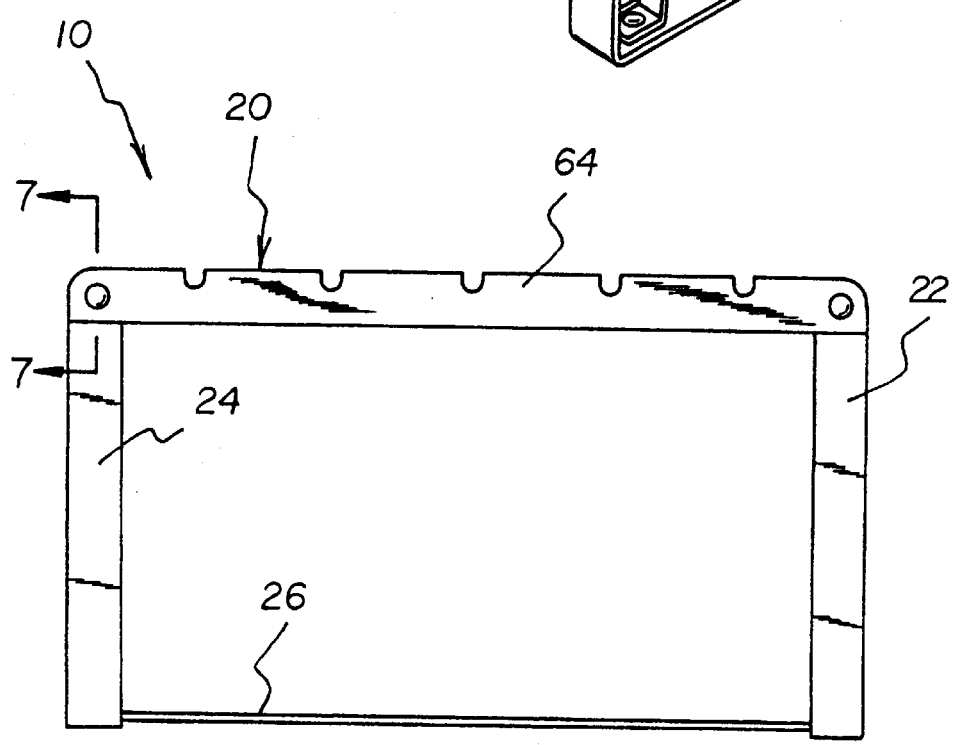
FIG. 2 is a side view of the present invention.
Figure 3:
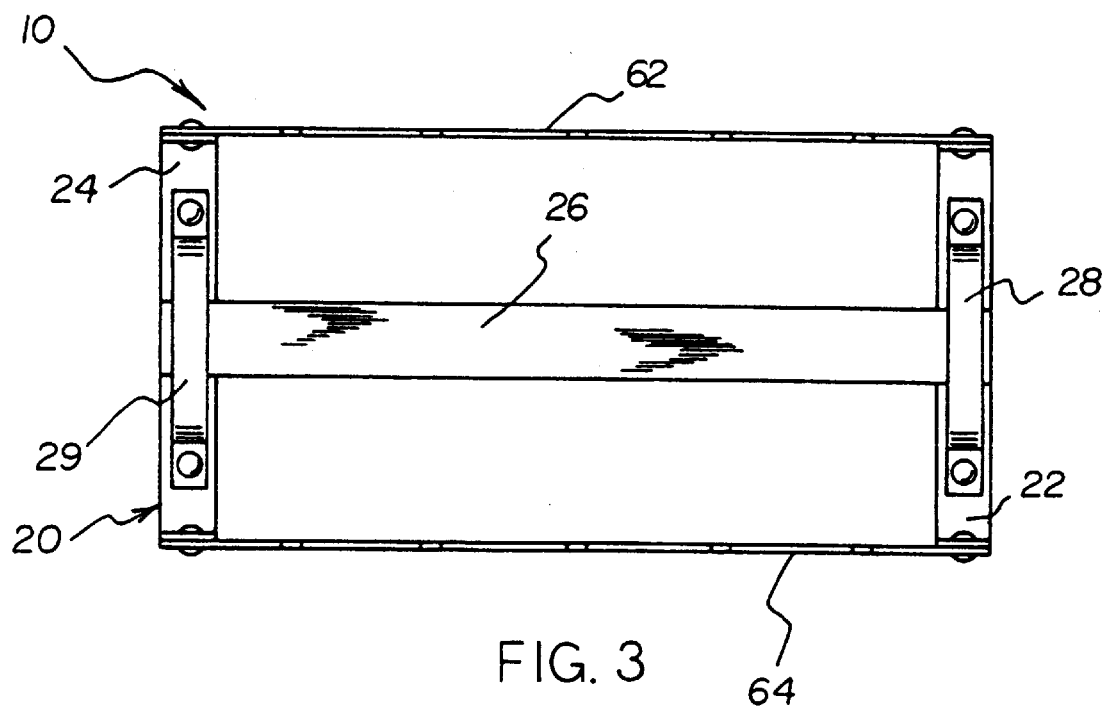
FIG. 3 is a top view of the present invention.
Figure 4:
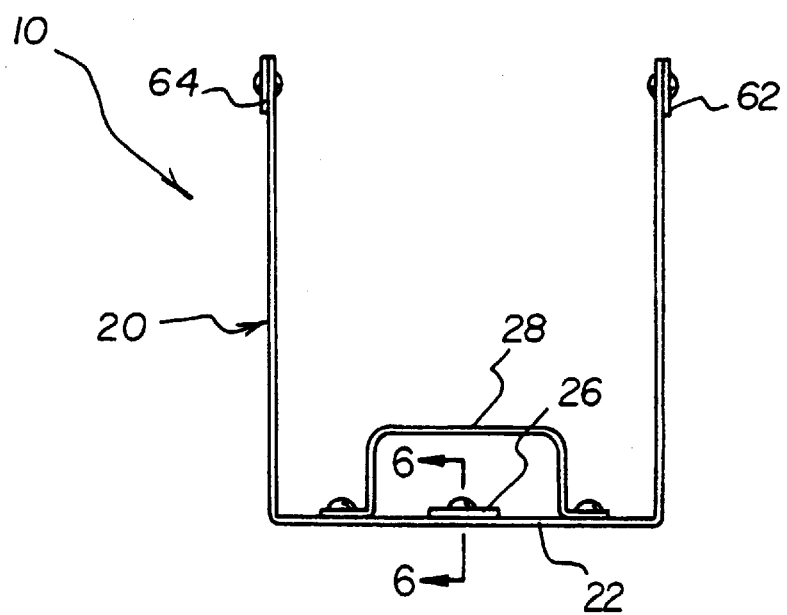
FIG. 4 is an end view of the present invention disclosing the first U-shaped band.
Figure 5:
FIG. 5 is a magnified view of the skewer member.
Figure 6:
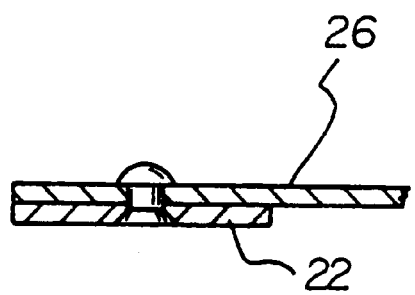
FIG. 6 is a cross sectional view taken along line 6—6 of FIG. 4 disclosing the bottom support member coupled to the first U-shaped band.
Figure 7:
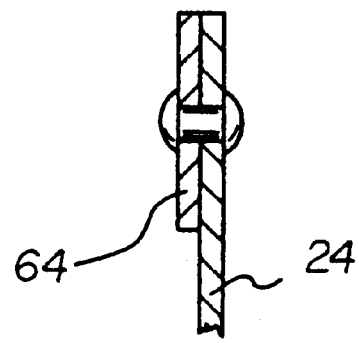
FIG. 7 is a cross sectional view taken along line 7—7 of FIG. 2 displaying the second upper member coupled to the second U-shaped band.

With reference now to the drawings, and in particular to FIGS. 1 through 11 thereof, a new jerky hanging rack embodying the principles and concepts of the present invention and generally designated by the reference numeral 10 will be described.

More specifically, it will be noted that the jerky hanging rack 10 comprises a rack structure 20 formed into an elongated U-shaped structure, and at least one skewer member 30 received by the cornice of the rack structure 20 thereby supporting a plurality of meat strips 12 above ground.

As best illustrated in FIGS. 1 through 11, it can be shown that the rack structure 20 includes a first U-shaped band 22 projecting vertically with respect to the ground. A bottom support member 26 is secured at one end to the central lower portion of the first U-shaped band 22 as best disclosed in FIG. 3 of the drawings. A second U-shaped band 24 is aligned parallel to the first U-shaped band 22. The end of the bottom support member 26 opposite of the first U-shaped band 22 engages the central lower portion of the second U-shaped band 24 thereby forming the elongated U-shaped structure. A first handle 28 is secured on the top surface of the central lower portion of the first U-shaped band 22. A second handle 29 is secured on the top surface of the central lower portion of the second U-shaped band 24. A first upper member 62 is orthogonally secured to an upper end of the first U-shaped band 22, and the opposite end of the first upper member 62 is secured to a corresponding upper end of the second U-shaped band 24. A second upper member 64 is orthogonally secured to an upper end of the first U-shaped band 22 opposite of the first upper member 62, and the opposite end of the first upper member 62 is secured to a corresponding upper end of the second U-shaped band 24 as best disclosed in FIG. 1 of the drawings. The first upper member 62 and the second upper member 64 receive at least one skewer member 30, supporting said skewer member 30 horizontal to the ground. The first upper member 62 includes a plurality of skewer slots 66, and the second upper member 64 includes a plurality of skewer slots 66 corresponding the skewer slots 66 of the first upper member 62 so as to align the skewer member 30 parallel with the first and second U-shaped bands 22, 24. The rack structure 20 is preferably constructed from a corrosion resistant rigid metal.

In use, the user places at least one skewer member 30 onto the first and second upper members 62, 64 received by the respective skewer slots 66. A plurality of meat strips 12 are centrally positioned about the skewer member 30 projecting vertically downward. The meat strips 12 are suspended for the required length of time to cure said meat strips 12. After the meat strips 12 have cured, the skewer member 30 suspending said meat strips 12 is removed from said skewer slots 66 thereby allowing removal of the meat strips 12 for consumption.

FIGS. 8 through 11 illustrate a second embodiment 40 of the jerky hanging rack that is used in the same manner as the first embodiment 10 to dry jerky. Specifically, the second embodiment of the jerky hanging rack 40 includes a base 41 which is preferably generally rectangular. The base 41 has upper and lower surfaces 42,43, a pair of ends, and front and back sides extending between the ends of the base 41. The upper and lower surfaces 42,43 of the base 41 are preferably substantially planar. Preferably, the base length is defined between the ends of the base 41, the base width is defined between the sides of the base 41, and the base thickness is defined between the upper and lower surfaces 42,43 of the base 41. Ideally, the base width is less than about two thirds the base length and greater than about one half the base length. In an illustrative example, the base length is ideally less than about 12 inches and the base width is ideally less than about 8 inches. In this illustrative ideal embodiment, it is preferred that the base thickness is less than about ⅕ inch.

The second embodiment 40 also includes a wall 46 which is also preferably generally rectangular. The wall 46 has front and back surfaces 47,48, a pair of ends, and upper and lower sides which extend between the ends of the wall 46. Like the base, the front and back surfaces 47,48 of the wall 46 are preferably substantially planar. The lower side of the wall 46 is coupled to the back side of the base 41 so that the wall 46 preferably extends substantially perpendicular to the upper surface 42 of the base 41. In the preferred embodiment, a wall length is defined between the ends of the wall 46, and a wall height is defined between the sides of the wall 46. Ideally, the wall height is less than about three quarters the wall length and greater than about one half the wall length. In the illustrative ideal embodiment, the wall height is less than about 8 ¼ inches and the wall length is less than about 12 inches.

Figure 8:
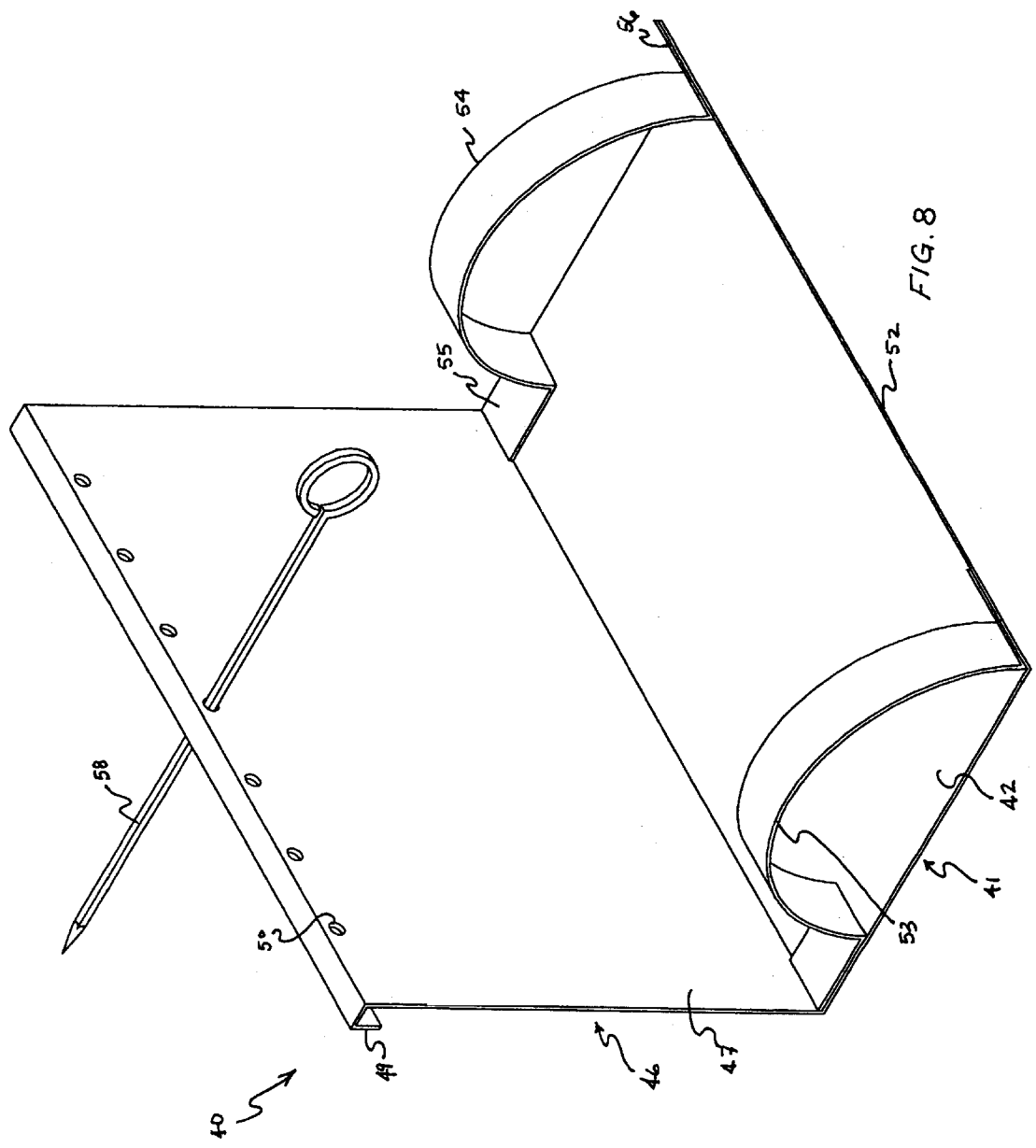
FIG. 8 is a schematic front perspective view of a second embodiment of the present invention.
Figure 9:
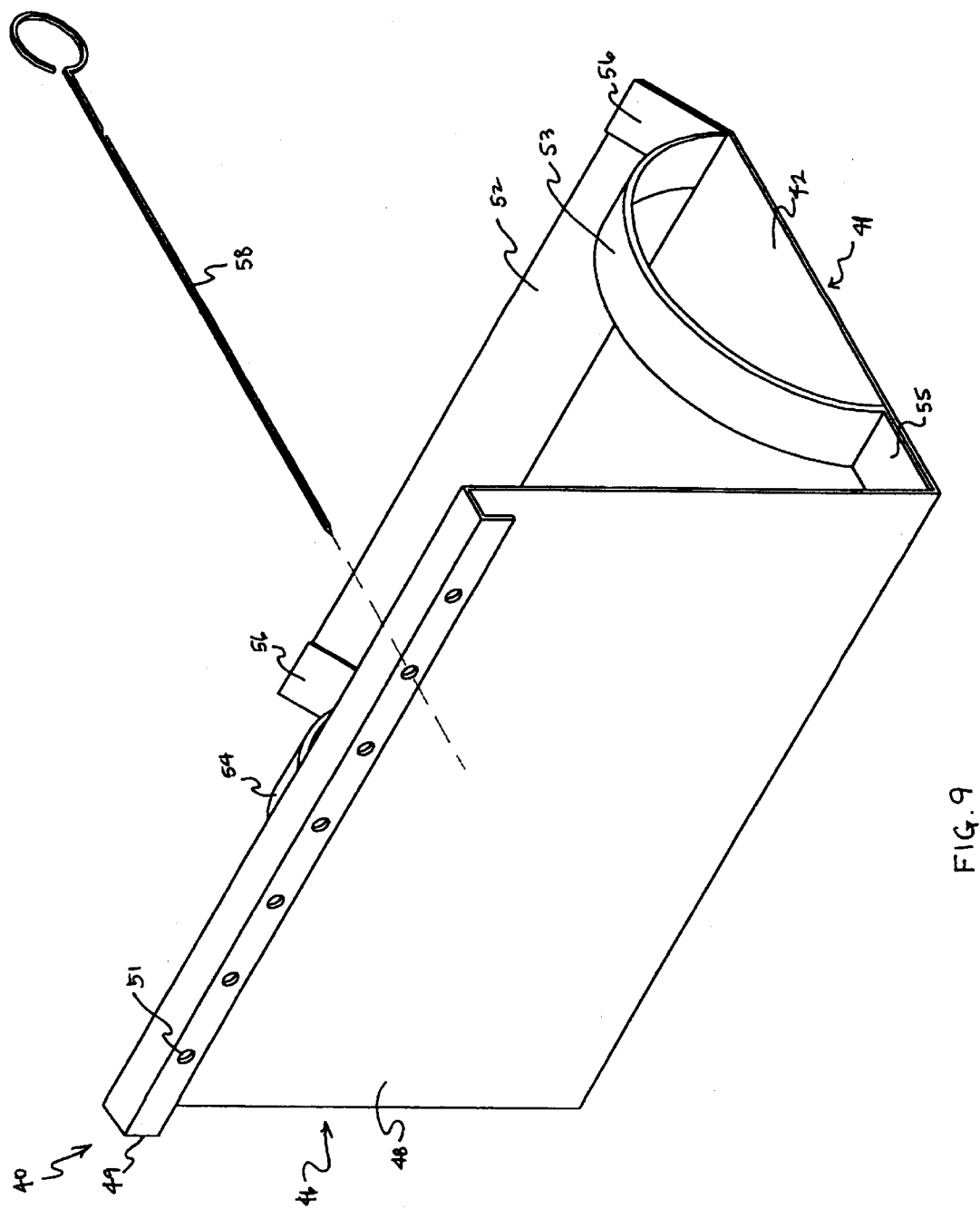
FIG. 9 is a schematic back perspective view of a second embodiment of the present invention.
Figure 10:
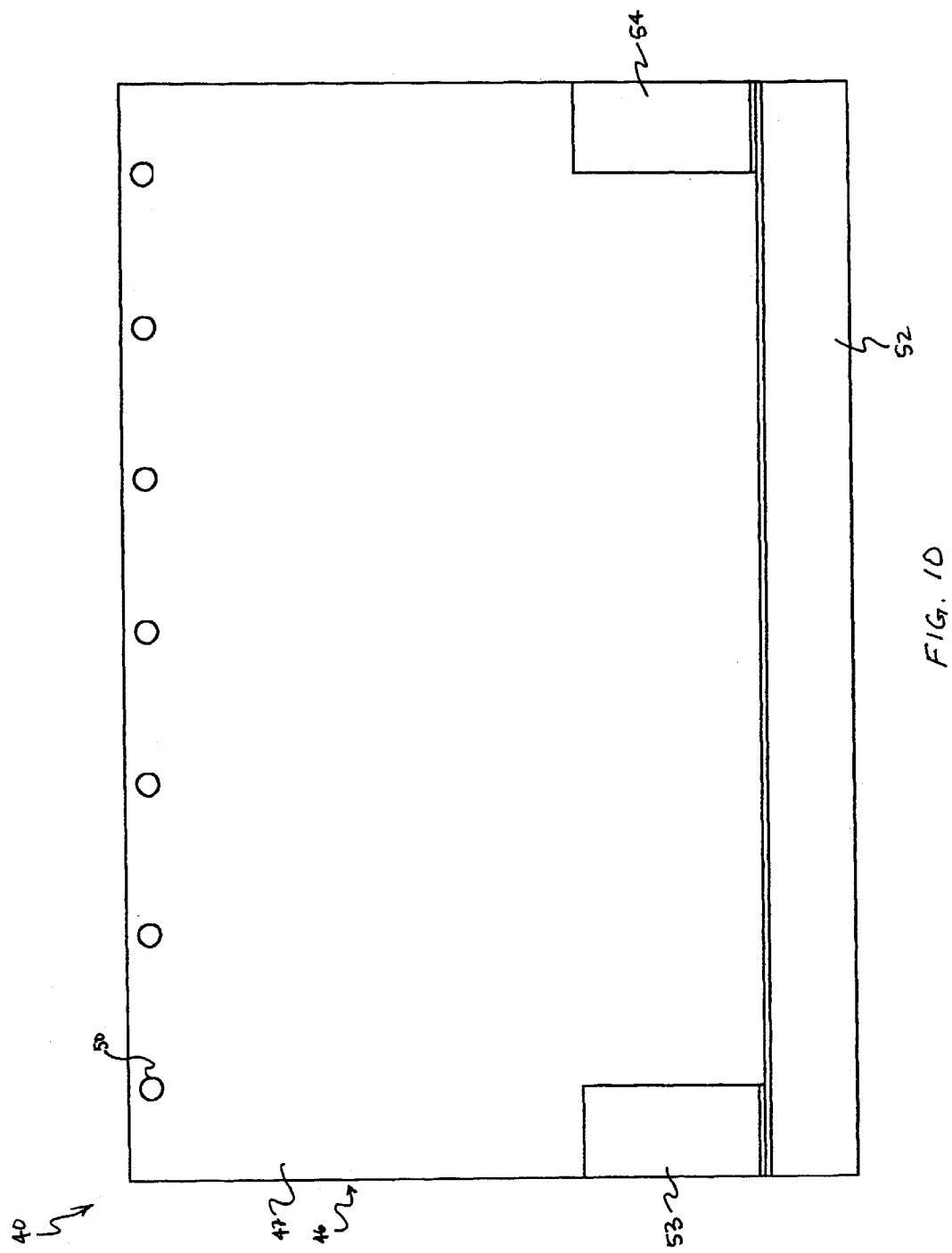
FIG. 10 is a schematic front side view of a second embodiment of the present invention.

As best shown in FIG. 9, the back surface of the wall 46 preferably has an elongate flange 49 extending from it and which is preferably located adjacent the upper end of the wall 46. The flange 49 has a generally inverted L-shaped cross section taken substantially perpendicular to the length of the flange 49 such that a portion of the flange 49 is extended in a downwards direction. The length of the flange 49 extends between the ends of the wall 46. As illustrated in FIG. 8, the wall 46 has a plurality of spaced apart holes 50 extending between the front and back surfaces 47,48 of the wall 46. As illustrated in FIG. 9, the flange 49 also has a plurality of spaced apart holes 51 extending through it. Each of the holes 51 of the flange 49 is associated with an associated hole 50 of the wall 46 so that each of the holes 51 of the flange 49 is generally coaxial with its associated hole 50 of the wall 46.

The second embodiment 40 also includes an elongate drip flange 52 which is coupled to the front side of the base 41. The flange 52 is extended outwardly and upwardly from the upper surface 42 of the base 41 with the length of the drip flange 52 extending between the ends of the base 41.

The second embodiment further includes a pair of handles 53,54. Each handle 53,54 is generally arcuate and has a pair of ends 55,56. One of the handles 53 is located adjacent one of the ends of the base 41 while the other handle 54 is located adjacent another end of the base 41. One end 56 of each handle 53,54 is coupled to the drip flange 52, while the other end 55 of each handle 53,54 is coupled to the upper surface 42 of the base 41 and is located adjacent the back side of the base 41.

At least one elongate skewer 58 is removably inserted into one of the holes 50 of the wall 46 and its associated hole 51 of the flange 49 such that the length of the skewer 58 is suspended above and generally parallel to the upper surface 42 of the base 41. The skewer 58 is ideally about 10 inches long and is adapted for hanging items such as meat thereon for making jerky in the same manner as the first embodiment.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A jerky hanging rack for supporting pieces of jerky above a surface for drying, the jerky hanging rack comprising:

a rack structure; and at least one skewer member;

wherein the rack structure includes:

a first U-shaped band having a central lower portion for resting on a surface and a pair of spaced arms extending upwardly from opposite ends of the center lower portion;

a second U-shaped band aligned parallel to the first U-shaped band having a central lower portion for resting on a surface and a pair of spaced arms extending upward from opposite ends of the center lower portion;

a first upper member having first and second ends, the first end being orthogonally secured to an upper end of one of the arms of the first U-shaped band and the second end secured to an upper end of one of the arms of the second U-shaped band; and a second upper member having first and second ends, the first end being orthogonally secured to an upper end of one of the arms of the first U-shaped band, and the second end secured to an upper end of one of the arms of the second U-shaped band.

2. The jerky hanging rack of claim 1 additionally comprising a first handle secured on a top surface of the central lower portion of the first U-shaped band, and a second handle secured on a top surface of the central lower portion of the second U-shaped band.

3. The jerky hanging rack of claim 1 wherein the first upper member includes a plurality of skewer slots and the second upper member includes a plurality of skewer slots for receiving spaced portions of the skewer member and supporting the skewer member in an orientation parallel to the surface on which the first and second U-shaped bands rest.

4. The jerky hanging rack of claim 1 additionally comprising a bottom support member having opposite ends, a first of the ends secured to the central lower portion of the first one U-shaped band and a second one of the ends secured to the central lower portion of the second U-shaped band.

5. A jerky hanging rack for supporting pieces of jerky above a surface for drying, the jerky hanging rack comprising:

a rack structure; and at least one skewer member;

wherein the rack structure includes:

a first U-shaped band having a central lower portion for resting on a surface and a pair of spaced arms extending upwardly from opposite ends of the central lower portion;

a bottom support member having opposite ends, a first one of the ends secured to the central lower portion of the first U-shaped band;

a second U-shaped band aligned parallel to the first U-shaped band having a central lower portion for resting on a surface and a pair of spaced arms extending upwardly from opposite ends of the central lower portion, wherein a second end of the bottom support member engages the central lower portion of the second U-shaped band;

a first handle secured on a top surface of the central lower portion of the first U-shaped band;

a second handle secured on a top surface of the central lower portion of the second U-shaped band;

a first upper member having first and second ends, the first end being orthogonally secured to an upper end of one of the arms of the first U-shaped band and the second end secured to an upper end of one of the arms of the second U-shaped band; and a second upper having first and second ends, the first end being orthogonally secured to an upper end of one of the arms of the first U-shaped band, and the second end secured to an upper end of one of the arms of the second U-shaped band.

6. The jerky hanging rack of claim 5, wherein the first upper member includes a plurality of skewer slots and the second upper member includes a plurality of skewer slots for receiving spaced portions of the skewer member and supporting the skewer member in an orientation parallel to the surface on which the first and second U-shaped bands rest.

7. The jerky hanging rack of claim 6, wherein the first upper member and the second upper member having an upper edge surface, with the skewer slots being formed in the upper edge surface of each of the upper members.

8. The jerky hanging rack of claim 5, wherein the rack structure is constructed from a corrosion resistant rigid metal material.

9. A jerky hanging rack for supporting pieces of jerky above a surface for drying, the jerky hanging rack comprising:

a base having upper and lower surfaces, a pair of ends and a front edge and a back side, wherein a base length is defined between said ends of said base, wherein a base width is defined between said front edge and said back side of said base, wherein a base thickness is defined between said upper and lower surfaces of said base;

a wall having front and back surfaces, a pair of ends and upper and lower sides, said lower side of said wall being coupled to said back side of said base;

wherein a wall length is defined between said ends of said wall, wherein a wall height is defined between said sides of said wall, wherein a wall thickness is defined between said front and back surfaces of said wall;

said wall having a plurality of spaced apart holes extending between said front and back surfaces of said wall;

a pair of handles, each handle is generally arcuate and having a pair of ends, one of said handles located adjacent one of said ends of said base, another of said handles located adjacent another end of said base; and at least one elongate skewer being removably inserted into one of said holes of said wall such that the length of said skewer is suspended above said upper surface of said base;

wherein said wall has an elongate flange extending from said upper side of said wall, said flange extending between said ends of said wall, said flange having a generally inverted L-shaped transverse cross section with a first portion extending substantially parallel to and away from said base and a second portion extending downwardly and substantially parallel to said wall, said second portion of said flange having a plurality of spaced apart holes extending therethrough, each of said holes of said second portion of said flange being axially aligned with an associated hole in said wall such that an end portion of said at least one skewer may be inserted through a pair of axially aligned holes to support said skewer above said base by engaging only said end portion of said skewer.

10. The jerky hanging rack of claim 9, wherein said base and said wall are generally rectangular.

11. The jerky hanging rack of claim 9, wherein said base width is less than two thirds said base length and greater than one half said base length.

12. The jerky hanging rack of claim 11, wherein said base length is less than 12 inches and wherein said base width is less than 8 inches, wherein said base thickness is less than 1/8 inch.

13. The jerky hanging rack of claim 11, wherein said wall height is less than three quarters said wall length and greater than one half said wall length.

14. The jerky hanging rack of claim 13, wherein said wall length is less than 8 1/4 inches, wherein said wall length is less than 12 inches.

15. The jerky hanging rack of claims 9, wherein said wall extends substantially perpendicular to said base.

16. The jerky hanging rack of claim 9, wherein the jerky hanging rack further comprises an elongated drip holding flange having a length, said drip holding flange is coupled to said front edge of said base, said drip holding flange extending outwardly and upwardly from said upper surface of said base, said length of said drip holding flange extending between said ends of said base.

17. The jerky hanging rack of claim 16, wherein one end of each of said handles is coupled to said drip flange, and wherein another end of each of said handles is coupled to said upper surface of said base and located adjacent said back side of said base.

\* \* \* \* \*